(12) United States Patent
Hoy et al.

(10) Patent No.: US 7,324,634 B2
(45) Date of Patent: Jan. 29, 2008

(54) TELECOMMUNICATIONS SYSTEMS

(75) Inventors: Michael D Hoy, Ipswich (GB); Mark A Fletcher, Ipswich (GB); Alan E Cooper, Ipswich (GB); Simon J Warwick, Somerset (GB)

(73) Assignee: British Telecommunications public limited company, London (GB)

( * ) Notice: Subject to any disclaimer, the term of this patent is extended or adjusted under 35 U.S.C. 154(b) by 897 days.

(21) Appl. No.: 10/332,536

(22) PCT Filed: Aug. 9, 2001

(86) PCT No.: PCT/GB01/03594

§ 371 (c)(1),
(2), (4) Date: Jan. 10, 2003

(87) PCT Pub. No.: WO02/13497

PCT Pub. Date: Feb. 14, 2002

(65) Prior Publication Data

US 2004/0023655 A1   Feb. 5, 2004

(30) Foreign Application Priority Data

Aug. 9, 2000   (EP)   ................... 00306776

(51) Int. Cl.
*H04M 15/00* (2006.01)
*H04M 1/24* (2006.01)
*H04M 3/08* (2006.01)
*H04M 3/22* (2006.01)

(52) U.S. Cl. ............... 379/133; 379/32.01; 379/15.05

(58) Field of Classification Search ........... 379/114.04, 379/133, 134, 137, 139, 112.01, 112.06, 32.01, 379/32.02, 14.01, 15.05, 22.03
See application file for complete search history.

(56) References Cited

U.S. PATENT DOCUMENTS

| | | | | |
|---|---|---|---|---|
| 4,371,758 A | * | 2/1983 | Ulrich | 379/25 |
| 4,456,788 A | * | 6/1984 | Kline et al. | 379/137 |
| 4,484,030 A | * | 11/1984 | Gavrilovich | 370/248 |
| 5,218,632 A | * | 6/1993 | Cool | 379/126 |
| 5,408,524 A | * | 4/1995 | Reum | 379/157 |
| 5,805,686 A | | 9/1998 | Moller et al. | |
| 6,385,444 B1 | * | 5/2002 | Peschel et al. | 455/405 |

FOREIGN PATENT DOCUMENTS

EP   0541145 A1   5/1993

OTHER PUBLICATIONS

Canadian Office Action issued Jun. 9, 2005 in corresponding Canadian Application No. 2,417,710.
Response to Official Action filed Nov. 9, 2005 in corresponding Canadian Application No. 2,417,710.
Notice of Allowance issued Nov. 1, 2006 in corresponding Canadian Application No. 2,417,710.

* cited by examiner

*Primary Examiner*—Quoc Tran
(74) *Attorney, Agent, or Firm*—Nixon & Vanderhye P.C.

(57) ABSTRACT

A telecommunications network includes a management system for analyzing call detail records (CDR's) from terminating switches. The management system recovers CDR's by polling through switch managers which poll dependent exchanges. CDR's indicating a call clear occurring within a short predetermined time after a call answer are stored and used to indicate potentially faulty access network lines.

36 Claims, 4 Drawing Sheets

Table A) Call Detail Records containing False Answer Event (Ring Trip) data for 01203 614357:

| Called DN | Line Number | NN1 | Date | Time | OLI | CDS | ReAns | T1 active Indicator | Ref |
|---|---|---|---|---|---|---|---|---|---|
| 01203 614357 | 0 | 0715027 | 2001-07-19 | 0845-20:19 | 01473 646412 | 0 | N | Y | A1 |
| 01203 614357 | 0 | 0715027 | 2001-07-19 | 0850-45:44 | 0121 566 6789 | 0 | N | Y | A2 |
| 01203 614357 | 0 | 0715027 | 2001-07-19 | 1057-58:39 | 01203 321569 | 0 | Y | Y | A3 |
| 01203 614357 | 0 | 0715027 | 2001-07-19 | 1342-01:09 | 0161 2233456 | 0 | N | Y | A4 |
| 01203 614357 | 0 | 0715027 | 2001-07-19 | 1605-30:14 | 01473 646412 | 0 | N | Y | A5 |
| 01203 614357 | 0 | 0715027 | 2001-07-19 | 1606-10:29 | 01473 646412 | 0 | N | Y | A6 |
| 01203 614357 | 0 | 0715027 | 2001-07-19 | 1606-50:55 | 01473 646412 | 0 | Y | Y | A7 |

Table B) Unbilled call records from CSS for 01473 646412:

| Calling DN | Called DN | Date | Time | Duration (hh:mm:ss:cc) | Ref |
|---|---|---|---|---|---|
| 01473 646412 | 01203 614357 | 2001-07-18 | 0920-37:22 | 00:28:05:78 | B1 |
| 01473 646412 | 01203 614357 | 2001-07-19 | 0845-20:19 | 00:00:09:33 | B2 |
| 01473 646412 | 0131 6756443 | 2001-07-19 | 1252-43:24 | 00:15:45:22 | B3 |
| 01473 646412 | 01473 231444 | 2001-07-19 | 1357-28:32 | 00:38:33:57 | B4 |
| 01473 646412 | 01473 776564 | 2001-07-19 | 1501-03:23 | 00:18:21:99 | B5 |
| 01473 646412 | 01203 614357 | 2001-07-19 | 1605-30:14 | 00:00:08:54 | B6 |
| 01473 646412 | 01203 614357 | 2001-07-19 | 1606-10:29 | 00:00:12:25 | B7 |
| 01473 646412 | 01203 614357 | 2001-07-19 | 1606-50:55 | 00:10:20:21 | B8 |

Table A) Call Detail Records containing False Answer Event (Ring Trip) data for 01203 614357:

| Called DN | Line Number | NNI | Date | Time | OLI | CDS | ReAns | T1 active Indicator | Ref |
|---|---|---|---|---|---|---|---|---|---|
| 01203 614357 | 0 | 0715027 | 2001-07-19 | 0845-20:19 | 01473 646412 | 0 | N | Y | A1 |
| 01203 614357 | 0 | 0715027 | 2001-07-19 | 0850-45:44 | 0121 566 6789 | 0 | N | Y | A2 |
| 01203 614357 | 0 | 0715027 | 2001-07-19 | 1057-58:39 | 01203 321569 | 0 | Y | Y | A3 |
| 01203 614357 | 0 | 0715027 | 2001-07-19 | 1342-01:09 | 0161 2233456 | 0 | N | Y | A4 |
| 01203 614357 | 0 | 0715027 | 2001-07-19 | 1605-30:14 | 01473 646412 | 0 | N | Y | A5 |
| 01203 614357 | 0 | 0715027 | 2001-07-19 | 1606-10:29 | 01473 646412 | 0 | N | Y | A6 |
| 01203 614357 | 0 | 0715027 | 2001-07-19 | 1606-50:55 | 01473 646412 | 0 | Y | Y | A7 |

Table B) Unbilled call records from CSS for 01473 646412:

| Calling DN | Called DN | Date | Time | Duration (hh:mm:ss:cc) | Ref |
|---|---|---|---|---|---|
| 01473 646412 | 01203 614357 | 2001-07-18 | 0920-37:22 | 00:28:05:78 | B1 |
| 01473 646412 | 01203 614357 | 2001-07-19 | 0845-20:19 | 00:00:09:33 | B2 |
| 01473 646412 | 0131 6756443 | 2001-07-19 | 1252-43:24 | 00:15:45:22 | B3 |
| 01473 646412 | 01473 231444 | 2001-07-19 | 1357-28:32 | 00:38:33:57 | B4 |
| 01473 646412 | 01473 776564 | 2001-07-19 | 1501-03:23 | 00:18:21:99 | B5 |
| 01473 646412 | 01203 614357 | 2001-07-19 | 1605-30:14 | 00:00:08:54 | B6 |
| 01473 646412 | 01203 614357 | 2001-07-19 | 1606-10:29 | 00:00:12:25 | B7 |
| 01473 646412 | 01203 614357 | 2001-07-19 | 1606-50:55 | 00:10:20:21 | B8 |

Fig 4

TELECOMMUNICATIONS SYSTEMS

This application is the U.S. national phase of international application PCT/GB01/03594 filed 9 Aug. 2001 which designated the U.S.

BACKGROUND

1. Technical Field

The present invention relates to telecommunications systems and more particularly, but not exclusively, to switches (exchanges), network management systems, fault location methods and billing and charging arrangements for such systems.

2. Related Art

Public switched telephone networks (PSTN) determine charging for calls on the basis of the duration of the call and/or the time at which a call through the network is answered by the called node. The billing of calls is accordingly dependent on the integrity of the analogue network even where sophisticated switching is used between the calling customer node and the destination node. The majority of the so-called local loop, that is the last leg between the destination exchange node and the customer premises, still comprises copper wire pairs and ways have been found to make increasing use of these pairs to provide complex services and multiple line services to customers.

Thus any fault in the local loop may result in deterioration of the quality of service to customers and potentially to customers being billed for ineffective communications calls. It is important for faults in the local loop to be identified at the earliest possible time so that corrective action may be taken before customer perception of quality of service deteriorates and to avoid potential regulatory conflict in connection with apparent billing accuracy.

BRIEF SUMMARY

According to one aspect of the present invention there is provided a method of detecting permanent or transient faults between or at a terminating network exchange node and a network user termination in which a network management system receives from a plurality of customer facing switches selected call detail records (CDR), each indicative of a potential false answer event (FAE), the CDRs being selected in respect of each call responding to a line signaling condition change with an apparent answer condition followed within a predetermined period of time by a call clear condition, accumulating within the network management system a record of each called network exchange node and/or each network user termination a respective data log indicative of false answer events and determining by thresholding against predetermined time and numeric criteria, identity of potentially faulty line conditions between or at particular network exchange nodes and network user terminations.

False answer events may be determined by thresholding of at least one integer representative of a pre-determined timed period in the network exchange node data and provide the identity of network user terminations likely to be in a failing condition.

The method may include measuring the time elapsed between a call answer condition and a call clear condition at the called network exchange node such that if the call clear condition occurs within a pre-determined period (T2), corresponding call charges will be inhibited if pertinent line fault conditions are proven to exist.

Monitoring of the call clear condition may occur only if the period between the line signaling condition change and the apparent call answering condition occurs within a predetermined period (T1).

The predetermined period (T1) typically lies within the range of zero (0) to one thousand (1000) milliseconds while the predetermined period (T2) typically lies between zero (0) and five hundred (500) milliseconds. Each of the pre determined periods may be adjustable by user intervention. In addition the first period (period between application of a calling signal and a loop answer signal) may be logically de-activated such that only the second period (the period between the loop answer signal and a loop clear signal) is necessary to detect a false answer event and hence caused the creation of a CDR.

According to a feature of the first aspect of the invention there is provided a method of inhibiting call charging including detecting a permanent or transient fault using the method above and, if the time elapsed between an apparent call answer condition and a call clear condition occurs within a predetermined period and subsequent testing determines that a call is probably ineffective, inhibiting call charging in respect of a corresponding billing CDR. The method may include deleting billing CDRs corresponding to potentially ineffective calls from a centralised billing system.

According to a second aspect of the invention there is provided a network management system including control means arranged to receive from each of a plurality of telecommunication switches a respective log of call detail records (CDR's) each including at least the identity of a network exchange node and/or a network user termination to which a terminating call has been directed and in which following application of a signaling condition change and an apparent answer condition and the period between the answer condition and a call clear condition is less than a predetermined period, the network management system including means to establish in respect of each terminating network exchange node and/or each end user termination featuring in at least one CDR an accumulator, the system further including comparison means for determining for each CDR the presence of an accumulator established by a previous CDR including the same terminating network exchange node identity or network user termination identity and to increment the respective accumulator, each accumulator being periodically compared with a threshold to determine the presence of a potential fault at or between the terminating network exchange node and the network user termination.

Preferably the network management system creates an action file, the action file comprising a list of network exchange nodes and network user terminations in priority order in dependence upon the number of potential false answer events occurring within a pre-determined period.

Preferably also, the CDRs are generated by the method of the first aspect of the present invention.

In a practical embodiment hereinafter described, each of the plurality of telecommunications switches maintains a log of CDRs representing potential FAEs and the system periodically polls each associated switch for transfer of the respective rolling log for processing. The control means may analyse each CDR in each said log to determine whether the CDR has been processed previously and deletes each previously processed CDR prior to incrementing accumulators in respect of identified terminating network exchange nodes and/or network user terminations.

A plurality of switch managers may be disposed between said network management system and the telecommunications switches, each switch manager periodically polling a respective plurality of switches for the respective logs, the network management system periodically polling the switch managers to effect transfer of the respective accumulated logs.

In a further aspect the present invention provides a telecommunications switch including control means to determine for each terminating call thereon, return of an answer condition in response to an applied change of line signaling conditions, said control means also determining a call holding period between the answer condition and a call clear condition, said control means creating for each terminating call in which the call holding period is less than a pre-determined period a call detail record including at least the identity of the network user termination for transfer to a network management system.

Preferably the call detail record also includes the identity of the terminating network exchange node. The predetermined period (T2) between the apparent call answer condition and the call clear condition may be adjustable by user intervention to a period of between zero (0) and two and one half (2.5) seconds, and is preferably be between zero (0) and five hundred (500) milliseconds. Monitoring of the call clear condition may occur only if the period between application of the line signaling condition change and the apparent call answering condition occurs within a predetermined period (T1) which may be user selectable between zero (0) and two and a half (2.5) seconds and is preferably between zero (0) and one thousand (1,000) milliseconds.

In accordance with a further aspect of the invention, a telecommunications network includes a plurality of switch manager systems each polling a respective plurality of digital local exchanges (DLE) to receive call detail records relating to calls terminating at network user terminations and which have been determined within the respective DLE which serves said termination to have had a call clear condition occurring within a predetermined short period after a call answer condition which in itself occurred after application of a change in line signaling conditions applied at the network exchange node serving said termination, the network further including a network management system arranged periodically to poll each of the switch manager systems and to receive the (CDRs) for all of the DLE's, the network management system determining from the received call detail records the identity of each network user termination featuring in at least one CDR and thereby identifying network user terminations which are potentially faulty, the network management system further providing a prioritisation of network user terminations in dependence upon the number of times the termination features in CDR's within a pre-specified period of time.

In a preferred embodiment, the CDR's created by the DLE's include information identifying the network exchange terminating node as well as the network user termination. CDR's determined as identifying short duration calls to faulty network terminations may be transferred to a network billing and charging system to permit cancellation or inhibition of call charges arising from such calls.

Alternatively, the network management system may delete CDR's from network billing systems where such CDRs relate to ineffective calls to a faulty network termination.

In a further alternative embodiment the invention provides a method of detecting permanent or transient network faults in which a call billing system transfers billing CDRs to a network management system, the network management system comparing CDRs with each other to determine the occurrence of a multiplicity of short duration calls to a particular network user termination within a pre-determined period, control means of the network management system creating an action list in respect of each potentially faulty network user termination for transfer to a line testing system.

Preferably the threshold for number of short duration calls is user selectable as is the pre-determined period. Generally, only multiple calls to a particular network user termination which originate from the same network user may be used to determine whether a fault is present. The thresholds may require the occurrence of four or more short duration calls within a period of five minutes each call being less than fifteen seconds in duration to determine a potentially faulty network user termination.

In a further feature of this aspect of the invention there is provided a method of inhibiting call charging in which after detecting a permanent or transient fault and, if subsequent testing determines that a call is probably ineffective, call charging in respect of a corresponding billing CDR is inhibited.

This may be by causing billing CDR's in respect of ineffective calls to be deleted from a centralised billing system. Where the call origination is not within the same billing environment, the system may notify the administration serving the call originating user termination of the identity of the ineffective call.

The invention also permits the detection of a potentially faulty network user termination point in a network other than the originating network using the method described above in respect of the further alternative embodiment and may include notifying the administration serving the faulty network termination point.

In a further feature the invention provides a method of detecting permanent or transient network faults in which records of each potentially faulty network user termination and/or each potentially fault network exchange termination node are stored and the stored records are periodically analysed to determine whether recurrent patterns of faults occur to permit identification of intermittently faulty nodes or terminations.

BRIEF DESCRIPTION OF THE DRAWINGS

A telecommunications system including DLE's, Network Management systems and billing systems in accordance with the features of the invention will now be described by way of example only with reference to the accompanying drawings of which:—

DETAILED DESCRIPTION OF EXEMPLARY EMBODIMENTS

The present invention both automates and improves the accuracy of existing telecommunication operator processes and procedures in respect of billing integrity in the presence of certain types of line fault conditions. It is based on the usage of switch generated call detail records (CDR) which identify potential or actual false answer events (FAE).

A false answer event is typically characterised by a premature cessation of exchange ringing caused by certain types of metallic access network fault conditions which mimic an answer condition followed by an apparent on-hook condition from the called network user termination. An equivalent term to false answer event is ring trip. This type of event may also occur prior to the application of the exchange ringing where DC line polarity reversal signals are used to alert/activate customer premise equipment (CPE) to an incoming call which is preceded by in-band signaling, typically FSK for the BT Caller Display Service. The selection of calls exhibiting false answer characteristics is determined by those having an apparent call answer condition occurring within a first predetermined period and a call clear condition occurring within a second predetermined period after first occurrence of the call answer condition.

It should be recognised that a small minority of CDRs containing instances indicative of false answer events, may be due to misconfigured or malfunctioning customer premises equipment, however, the overall process described hereafter will combine to isolate the true cause of such instances and allow the administration to take appropriate proactive corrective measures in conjunction with the end-user or customer so affected where appropriate. Thus the present invention provides not only assurance of network quality but also the ability to detect certain customer premises equipment faults which manifest as apparent network faults.

Figure 1:
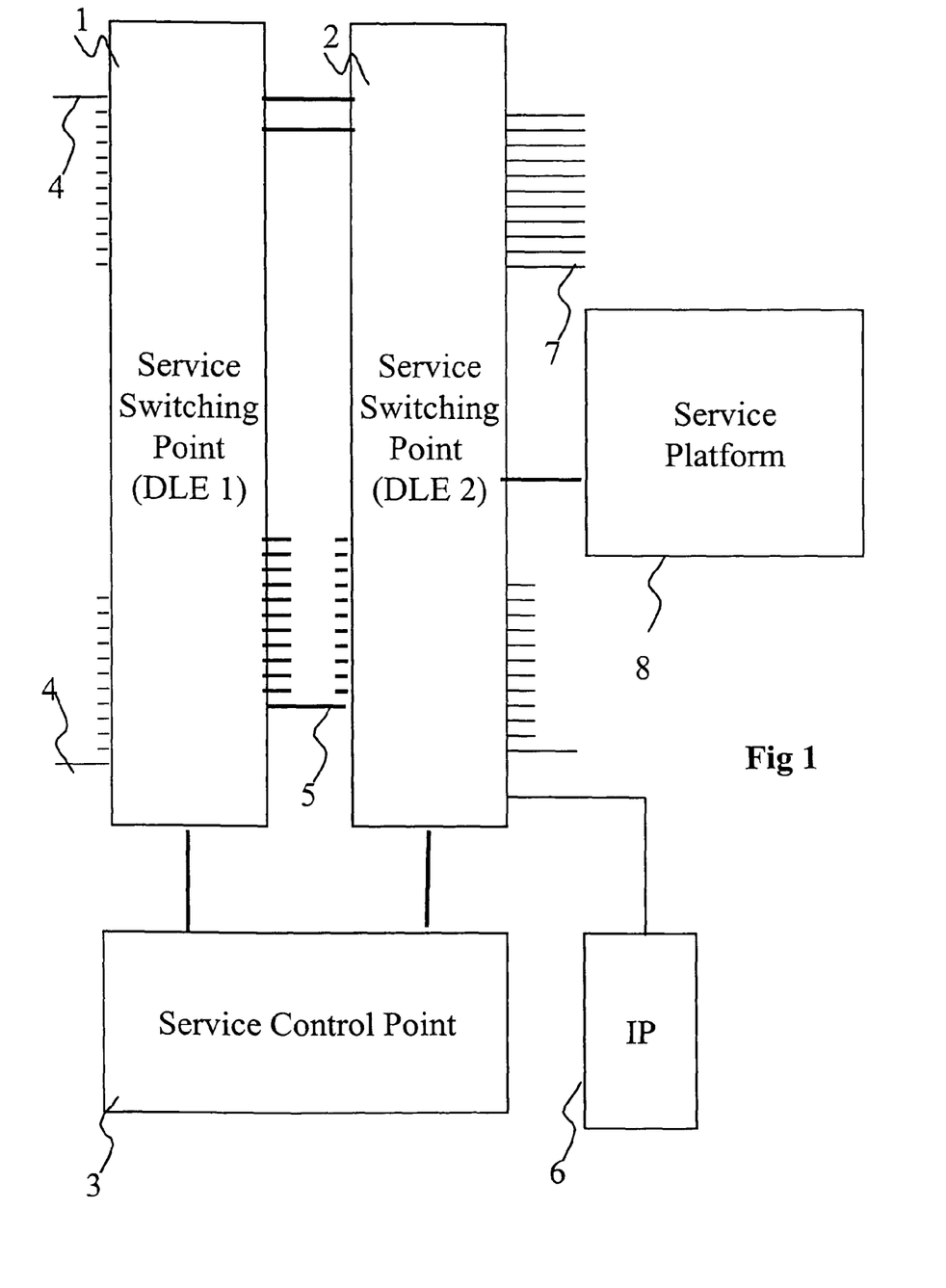
FIG. 1 is a block schematic diagram of a typical PSTN.

Referring first to FIG. 1, a typical modern PSTN comprises a number of Digital local exchanges (DLEs) 1,2 (only two of which are shown for convenience) and one or more service control points (SCPs) 3.

DLEs are interconnected by high grade communication links 5 which carry digital signals currently in time division multiplex form and in known manner. The Invention has no dependency on the current transmission technology used to convey telephony/data between DLEs and higher order exchanges. It will therefore be applicable as networks evolve to packet based Internet Protocol (IP), cell based Asynchronous Transfer Mode (ATM), Synchronous Digital Hierarchy (SDH) or similar technology. The invention is also not affected by the transmission media between the exchange hierarchy whether in metallic, optical, radio or other transmission media. Each of the DLEs is also connected to a local access distribution network comprising individual customer connections 4, which are connected to customer premises and represent a point of presence on the network for the customer being served.

At some points in the network, service platforms for performing particular functions may be provided as indicated by the service platform 8 and various intelligent peripherals 6 may be used to provide additional services, for example, voice prompt and collect arrangements.

Much of the connection between a DLE (for example the DLE 1) and customer premises equipment is likely to be in the form of copper wiring or analogue communication means. Thus on the customer side of a DLE 1 analogue communication from the customer premises is converted to digital form and control means of the DLE then directs the digitised channel communication through the network to the required point of presence at the same or another DLE 1, 2. Intelligence provided within the DLE is capable of dealing with most routine calls, such calls consisting of signaling received on the line 4 from customer premises to detail the required network destination. However, should some service peculiarity arise the intelligence of the DLE is interrupted and a message is sent to the SCP 3, which may return signals indicating the manner in which the DLE is to handle the current call.

The present invention is concerned with the answering of calls through the network at the receiving network exchange node, for example on an analogue output to a customer connected to the line 7. The Invention has no dependency on the current access transmission technologies (digital or analogue) used to convey telephony/data between the local DLE and an analogue presentation at the customer premises. It is therefore equally applicable in the presence of Digital Subscriber Line (DSL) technologies such as Asymmetric Digital Subscriber Loop (ADSL) and Very high speed Digital Subscriber Loop (VDSL).

If the customer line 7 develops a fault which mimics customer answer on receipt of ringing current (an electrical signal designed to alert equipment at the customer premises connected to the line 7) then an apparent near immediate answer followed rapidly by a call clear may occur when the ringing current and any associated DC conditions (e.g. line polarity reversal) are removed.

For the avoidance of doubt it is here noted that network faults which mimic other kinds of answer (for example ISDN answers) may also occur on the analogue side of the communications network shown and the present invention is also intended to cover the detection of this type of fault e.g. where standard analogue telephony interfaces are provided via purely digital ISDN bearer circuits. The system also detects potential failures of pair gain system analogue ports such that the CDR's always report false answer events which occur between the DLE concentrator and the end user.

Figure 2:
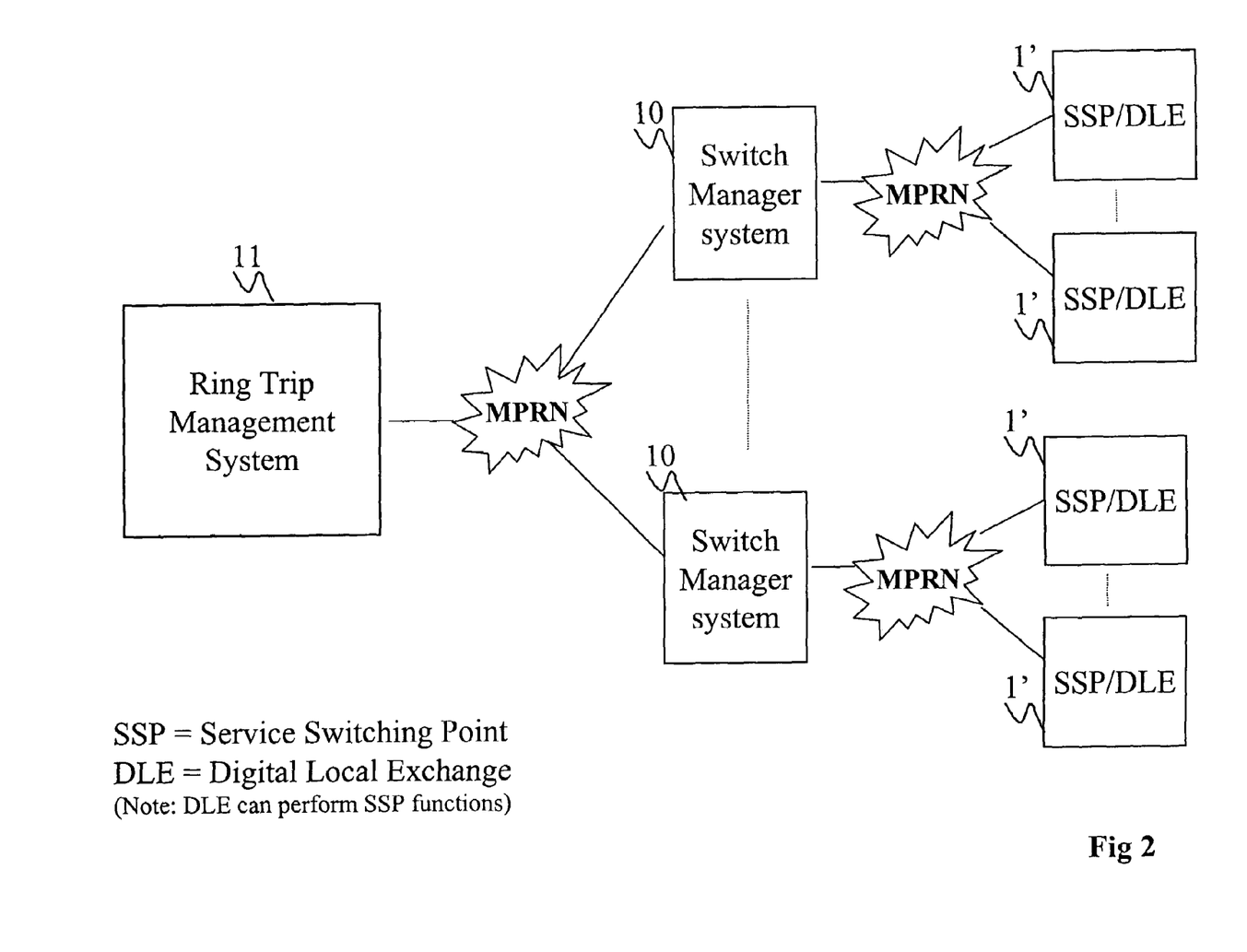
FIG. 2 is a block schematic diagram of a telecommunications network including the ring trip management system (RTMS) of the invention.

Referring now to FIG. 2, a number of DLEs 1' are shown to represent the totality of the network or PSTN.

A plurality of switch manager systems 10 (only two of which are shown) is arranged to poll associated DLEs 1' by way of a multi-protocol router network. The switch manager system receives from the DLEs, call logs of CDRs of suspected false answer (ring trip) events collected by the DLEs in the manner hereinafter described.

A Ring Trip Management System (RTMS) receives the combined records from the switch management systems again via a multi-protocol router network. Each of the DLEs 1' may be either typically a System X telephone exchange of the kind manufactured by Marconi Communications Systems Limited in the United Kingdom or an AXE10, for example, as manufactured by Ericsson Telecommunications Systems Limited. The invention as described is equally applicable for implementation on exchange technology produced by any other telecommunications equipment manufacturer.

Considering now the switch manager system itself, each switch manager node 10 periodically obtains from its dependant DLEs 1' all collected CDRs indicative of false answer events from the rolling log kept by the exchange. Thus, generally once or more in each 24 hour period, the switch manager polls each DLE by forwarding a command to the control means of the DLE to effect CDR records retrieval. The CDR records retrieval process creates a file of false answer events in a working directory indicating the exchange type and date and adds appropriate header information to the file including the source switch manager node name and other parameters. The list CDR or false answer event (FAE) record command e.g. "LIRTP" or an equivalent specified by the switch manufacturer and preceded by a known log-on name and password code from the switch manager enables read back of the exchange response and creation of the false answer event record file. The ring trip record log returns parameters defining each of the suspected false answer event calls having as a minimum the identity of the called directory number (the network point of presence at which the call terminated) and where available the calling directory number (the network point of presence from which the call originated) together with at least the date and time of the call attempt. Where the calling directory number is not available for any reason an appropriate reason code is provided e.g. UA indicating unavailable. Preferably the CDR will also contain other parameters which will be desirable in relation to the off-line processing of the CDR records indicative of a false answer event as produced by the terminating network exchange node and will be used in conjunction with corresponding information contained in the call billing records produced by the originating network exchange node.

The collected records are held within the switch manager system in respect of each dependant DLE, the data being stored in a secure directory available for access by or transmission to the RTMS 11.

Figure 3:
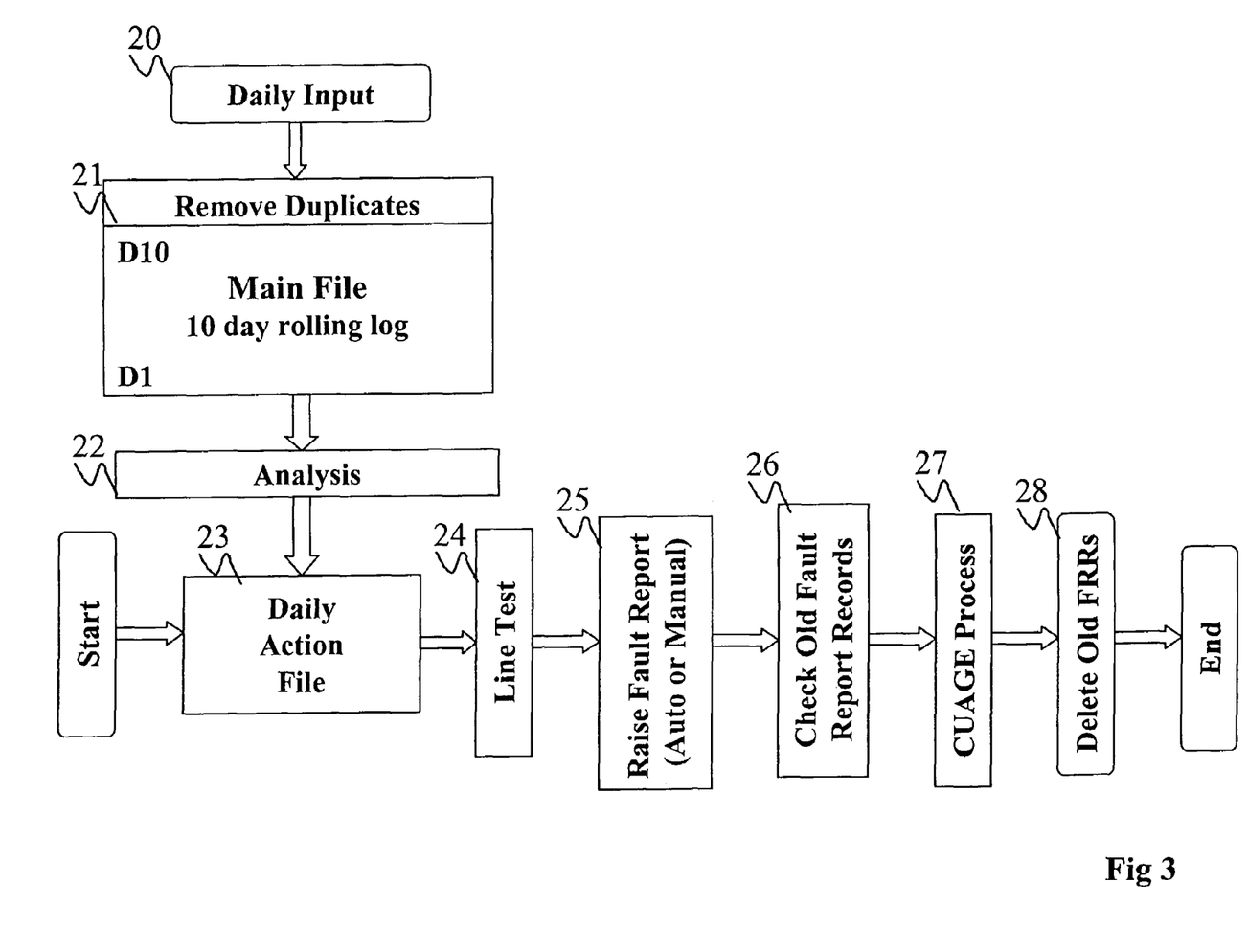
FIG. 3 is a schematic flow diagram relating to the operation of the RTMS.

Referring now to FIG. 3, the RIMS receives from all of the switch managers (10 of FIG. 2) a daily input 20 comprised of all of the CDR records generated by false answer events in which a ring trip fault is suspected. Each of the switch managers will provide individual files for each switch technology type e.g. one in respect of all attached System X exchanges and one in respect of all attached AXE10 exchanges in order to cater for apparent differences between the kind of records supplied by each type of exchange. It will be appreciated that provided the data is present the number of file types is dependent solely on the number of types of exchanges connected to the system and the kind of log which such exchanges can provide. Each of the files uploaded to the RTMS contains all suspected false answer event records for all the relevant DLEs accessible from or parented on the particular switch manager node. The term false answer event relates to a single event record contained in a CDR as returned from an exchange, that being a record (or call) matching specified criteria of time to answer and time to clear after answer, these periods being adjustable within the control means of each exchange to enable restriction of the number of records received. The number of records stored by the DLE may be determined by the administration although at present it is considered that a log file of 1,500 CDR records is sufficient given prevailing network user termination volumes per DLE. This log file size could be dimensioned in accordance with the rate of incidence of CDR/FAE records and the DLE file extraction periodicity. As a consequence of the multi-processor control architecture of modern digital exchange systems a high incidence of FAEs may potentially occur within the domain of one of the control processors, representing an imbalance of FAE incidents across the multi-processor as a whole. This may cause a shortage of available unpopulated CDR template records on the affected processor, and thereby prevent FAE reporting for a short period of time. It is essential that the administration is made aware of this occurrence to allow investigative and/or corrective action, this being achieved by the provision of a transient fault report indicating temporary exhaustion of unpopulated CDR template records. The file held in the switch manager is a rolling log of CDR records per associated reporting DLE, each stored in a chronological order. However, since reporting is by a rolling log of typically 1500 records per DLE, the same event may be reported on multiple successive days until overwritten. The detection and elimination of these duplicate records is a function of the RTMS system.

The RTMS management system maintains a ten-day rolling log in its main file with the oldest records at day one and current records at day ten so that before adding new records to the system duplicates received from the daily input are removed so that only a ten-day rolling log of unique false answer events is maintained in the main file. Any retained duplicate records from the switch managers being deleted as indicated at step 21. The polling and analysis is likely to be carried out at a quiet time for the PSTN, for example, in the early hours of the morning when few telephony calls are occurring.

The main file may now be analysed at 22 to determine, as hereinafter described, those records which in combination give an indication of a faulty line 7. The output of this analysis results in the addition of suspected faulty directory numbers to a daily action file 23. These may be assigned a priority level in dependence upon the number of CDRs associated with each called directory number and the length of time, for example, for which the fault has been present.

Indicated in the horizontal direction of FIG. 3 is a further daily process which occurs within the RTMS. The daily action file 23 contains both a list of newly suspected faulty directory numbers requiring line test 24 and in addition previously identified faulty directory numbers together with their fault-cleared/still-faulty status. The daily action file maintains the current status of all suspect or faulty lines and has several associated status and information fields accessed via directory number as a primary key.

Automatic line testing may be caused to be carried out at 24 and a fault report raised 25. This fault report 25 may be raised automatically and immediately following the line test 24 or if a customer appointment is required the fault report 25 may be queued for manual intervention.

Following this, the RTMS program causes the old fault report records to be checked 26 to determine if there is a fault-cleared status and if so the fault report record will be deleted 28 from the daily action file 23 following the call CUAGE process 27.

The RTMS management system then causes a billing system to run a cancellation program at step 27, which causes cancellation of any unbilled usage call records on a daily basis. The billing record cancellation process (CUAGE 27) automatically identifies those billing records which have an associated CDR false answer event record stored within the main file 21 with matching parameters of typically date, time, originating and called directory numbers. Running of the cancel unbilled usage (CUAGE 27) program may also be manually started. Note that the CUAGE program has the facility to take in to account additional CDR record parameters e.g. identification of re-answer condition. The re-answer parameter enables RTMS to identify those CDRs which should not result in the associated billing record being deleted since a valid call occurred.

Considering then each of the individual sections of FIG. 3, and noting that in the United Kingdom eighteen switch management systems are used at 2.00 am (or such other time as may be appropriate) the RTMS polls each of the eighteen sites and using secure log-on procedures obtains the AXE10 and System X file of false answer events. Following daily input processing and removal of duplicate CDRs 21, the RTMS now holds a file of false answer events in the main file representing a list of unique false answer events recorded nationally in the United Kingdom over the most recent ten-day rolling period. Even if a record persists in the rolling false answer event file of a DLE it will still appear only once in the main file associated with the appropriate day.

The analysis 22 allows the RTMS to assign a priority level for each unique terminating directory number appearing in the ten-day rolling log main file. Priority level is dependent on analysis of individual false answer event records from the main file relating to the particular terminating directory number. Some or all of the conditions may be examined to determine the priority level, for example, the number of false answer events occurring on the latest day where less than a specified number of false answer events occurring on day ten indicates a low priority, while another greater threshold of false answer events may result in higher priority. A further criteria applied may be the ratio of re-answered false answer event calls to non re-answered false answer event calls occurring today or over the previous x days where x is a configurable number. A further alternative may be to consider the number of false answer events occurring over a number of days so that only directory numbers with a number of false answer events exceeding a particular threshold over a plurality of days result in a higher priority being assigned.

The analysis may determine that where there are less than a predetermined threshold of false answer events occurring in respect of a directory number within the ten-day period a zero (0) priority is assigned so that a daily action file is not clogged by single apparent false answer events as might be attributable to an isolated incident of end-user mis-operation at the point of call answer e.g. switch hook fumble, accidental or otherwise.

The created daily action file in the RTMS has the terminating directory number and priority level stored in respect of the analysed false answer events. Each unique terminating directory number has only one record entry consisting of multiple fields in the action file and the records therein are ordered in priority level. Directory numbers with a priority level of zero (0) are not included in the daily action file. The daily action file maintains the current status of all suspect or faulty lines and has several associated fields accessed via directory number as a primary key.

In the line test function 24 all directory numbers appearing in the daily action file are automatically line tested in priority order using an auto-test function of the DLEs in known manner. The line test results are captured and may be stored in association with the action file information and individual line test result parameters being compared against look-up table thresholds, for example, of resistance between A and B legs and between B and A legs, A leg to earth, B leg to earth, A to battery and B to battery along with DC voltage checks and other resistance threshold parameters. Assuming that the line test results satisfy the look-up table requirements and thresholds for identifying faulty lines then the test result is subject to further parametric analysis by the customer service system (CSS) to determine whether the fault requires a customer site visit. The relevant line test result parameters and fault location details are stored against the relevant directory number in the daily action file 23.

The customer service records on the customer service system (CSS) may be checked automatically to determine whether there is an outstanding fault report raised against the directory numbers marked faulty in the daily action file 23. If an outstanding CSS fault record is identified against a directory number then the CSS fault report notes may be automatically annotated by the system and the relevant CSS fault report number stored within a field of the daily action file 23 to enable the status of the fault to be tracked. If there is no outstanding fault recorded in the customer service system (CSS) records then a CSS fault report is automatically raised 25 if the CSS line test result indicates a network fault where customer site access is unnecessary, otherwise the directory number is added to a customer appointment assignment list for manual intervention. In addition, the fault report details are written to the daily action file 23. Prior to the despatch of engineers to rectify faults determined as being within a customer's premises, the directory numbers are re-tested and for those that remain faulty, a CSS fault report is raised and a customer appointment arranged if possible. If a subsequent line test result is OK then the directory number may be removed from the action list. However, this is dependent upon fault incidence history template parameters. Directory lines which return an unable to test result to automated testing systems cause the directory number to be left in the action list for automatic or manual re-testing at a subsequent time.

The status of each directory number in the daily action file is closely tracked by the system to ensure that the line test 24, raise fault report 25, check old fault records 26 and removal of potentially inaccurate billing records (the CUAGE process 27) occurs as appropriate. The directory number will only be deleted from the daily action file when a fault report is closed as indicated when the check old fault records 26 occurs and after the bill cancellation program 27 has effected removal of the calls. The CUAGE program 27 removes mischarged calls from calling customer bills. Once CUAGE has occurred, the relevant CDR records contained in the main file 21 have their status updated to CUAGED. Generally any fault will be closed prior to entering the CUAGE process. However, as an option, CUAGE may be performed daily whilst an active fault remains in the daily action file. Typically where a fault is not cleared within the ten-day period stored in the main file (or such other rolling period as appropriate) the network billing system is instructed to delete from calling customer bills any call billing records which match CDRs containing false answer events. Thus when a fault has been cleared, a list of unique originating directory numbers which made calls to that destination directory number and which produced false answer events that were stored in the main file 21, is created. For each unique originating directory number in the list, all unbilled call records are extracted from the CSS billing control subsystem. The CDRs containing the false answer events associated with the faulty terminating directory number are then compared and matched against the unbilled call records for each of the unique originating directory numbers. Where a match is found, the CUAGE process 27 is actioned and the unbilled call record is deleted.

Figure 4:
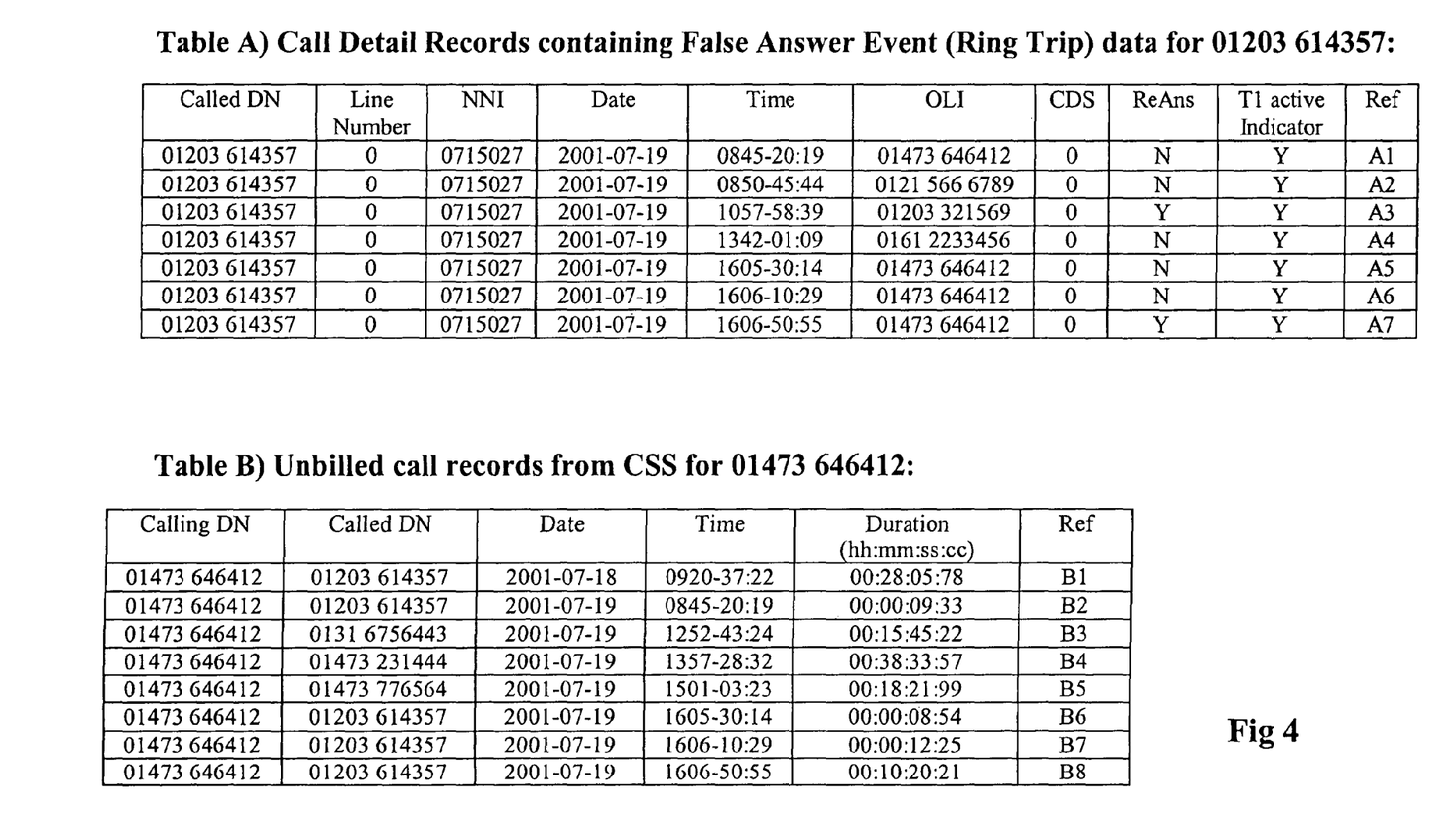
FIG. 4 is a schematic hypothetical rolling log in respect of potential failed calls.

Consider now FIG. 4, consisting of tables A and B. Table A shows an example of some CDRs containing fault answer event records for called directory number 01203 614357. Table B shows the corresponding unbilled call records from CSS for just one of the unique calling directory numbers (01473 646412) which encountered false answer events/ring trip.

Prior to the occurrence of the line fault condition on 01203 614357, a successful call was made on 18 Jul. 2001 from 01473 646412 (B1). At some point prior to 08:45 on 19 Jul. 2001, a line fault condition developed and thereafter certain calls to this circuit resulted in false answer events which are shown in Table A. Some of these calls resulted in a re-answer condition occurring subsequent to the false answer event (A3, A7) and hence a useful telephony call resulted. Considering the first of the unique calling directory numbers 01473 646412, Table B shows the resultant output of the unbilled call records which were extracted from CSS. Included in this are the following call records which match by date, time, calling and called directory number fields against parameters of the corresponding false answer event records:

B2 maps to A1, no re-answer condition therefore call record to be deleted*

B6 maps to A5, no re-answer condition therefore call record to be deleted*

B7 maps to A6, no re-answer condition therefore call record to be deleted*

B8 maps to A7, re-answer occurred resulting in a 10 minute & 20 second valid call—therefore call record to be billed as normal.

(*call record deletion is achieved by use of the CUAGE process 27)

The following table shows all the fields within the CDR false answer event template and describes each of the individual fields.

| Field Name | Field Requirement/Description |
|---|---|
| Called Directory Number i.e. (DN) | This field contains the full national number in ASCII/IA5 Numeric characters) including the leading 0. |
| Line Number | This field contains the "Line Number" relevant to the false answer/ring trip event for the called MLG or the value "0"in the case of single analogue lines, the output being in ASCII/IA5 Numeric characters).<br>Note 1: The value for the Line Number field shall be derived from the software resource parameters indicating MLG/PBX Line Number. |
| Network Nodal Identity (NNI) | This field shall contain the Network Nodal Identity NNI of the exchange in the form of 7 ASCII/IA5 numeric characters. |
| Date (of Ring Trip/ False Answer Event) | The date shall be presented in the form YYYY-MM-DD for example the 5$^{th}$ April 2000 shall be output as: 2000-04-05 (The output shall be in ASCII/IA5 Numeric characters). |
| Time (of Ring Trip/ False Answer Event) | The (False Answer) time shall be presented in the form HHMM-SS:SS (The output shall be in ASCII/IA5 Numeric characters). Note 1: This field shall be accurate to nearest 10 ms. |
| Originating Line Identity (OLI) | This field shall always be populated as applicable with one of the following options:-<br>(a) The originators full Network CLI presented in its national dialable form including the national trunk prefix (0).<br>(b) UA indicating UNAVAILABLE to the administration<br>(c) NA indicating NOT Applicable (Used for non-chargeable calls).<br>(d) IC indicating International calls where a CLI is not passed between administrations. |
| CDS Indicator (Caller Display Service) | This field shall be set to the ASCII/IA5 numeric characters '0' or '1' or '2' as applicable [using rules below] to indicate whether the CDS feature is provided & Active at the time of the event).<br>0 = Not a CDS Customer or CDS feature Not Active<br>1 = CDS Active & Pre-Ring Ring Trip occurred<br>2 = CDS Active & RINGING_State Ring Trip occurred |
| Re-Answer-Indicator | This field shall be set to 'Y' or 'N' as applicable. Note: This field indicates if called termination Re-Answered during the Called Subscriber Held (CSH) period. |
| T1 (Time to Answer) active indicator | This field shall be set to 'Y' or 'N' as applicable. Note: This field indicates if Timer T1 is set operative by the administration. |

It is here noted that while the present specification proposes a system in which switch managers collect false answer event records by polling dependent DLEs and the RTMS polls the switch managers, other implementations of the transfer of CDR's defining false answer events are possible. It will be apparent that direct polling of each of the DLEs from the RTMS would be a satisfactory solution. Alternatively, false answer event records could be transmitted directly from either the switch manager of the DLE to the RTMS by data messaging means through the MPRN at periodic intervals. In another option FAE records could be extracted directly by the RTMS using closed user group access to the switch managers in conjunction with transparent mode DLE access.

While in general the invention has been described primarily in respect of analogue network answering conditions it is here noted that where short duration calls occur on other kinds of local loop, including but not limited to ISDN local loop, the invention may be used to identify other forms of network, protocol or connected terminating equipment faults.

What is claimed is:

1. A method of detecting permanent or transient faults between or at a terminating network exchange node and a network user termination in which a network management system:

receives from a plurality of customer facing switches selected call detail records (CDR), each indicative of a potential false answer event (FAE), the CDRs being selected in respect of each call responding to a line signaling condition change with an apparent answer condition followed within a predetermined period of time by a call clear condition, accumulates a record of each called network exchange node and/or each network user termination a respective data log indicative of false answer event; and determines by thresholding against predetermined time and numeric criteria, identity of potentially faulty line conditions between or at particular network exchange nodes and network user terminations.

2. A method of detecting permanent or transient faults according to claim 1 in which said predetermined period (T2) is adjustable by user intervention to a period of between zero (0) and two and one half (2.5) seconds.

3. A method of detecting permanent or transient faults according to claim 1 in which the predetermined period (T2) between the apparent call answer condition and the call clear condition lies between zero (0) and five hundred (500) milliseconds.

4. A method of detecting permanent or transient faults according to claim 1 in which monitoring of the call clear condition occurs only if the period between the line signaling condition change and the apparent call answering condition occurs within a predetermined period (Ti).

5. A method of detecting permanent or transient faults according to claim 4 in which the predetermined period (T1) is user selectable between zero (0) and two and one half (2.5) seconds.

6. A method of detecting permanent or transient faults according to claim 4 in which the predetermined period (Ti) lies between zero (0) and one thousand (1,000) milliseconds.

7. A method of inhibiting call charging including detecting a permanent or transient fault using the method of claim 1 and, if the time elapsed between an apparent call answer condition and a call clear condition occurs within a predetermined minimum period and subsequent testing determines that a call is probably ineffective, inhibiting call charging in respect of a corresponding billing CDR.

8. A method of inhibiting call charging according to claim 7 in which billing CDR's in respect of ineffective calls are deleted from a centralized billing system.

9. A network management system comprising:
control means arranged to receive from each of a plurality of telecommunication switches a respective log of call detail records (CDR's) each including at least the identity of a network exchange node and/or a network user termination to which a terminating call has been directed and in which following application of a signaling condition change and an apparent answer condition and the period between the answer condition and a call clear condition is less than a predetermined period,
means to establish in respect of each terminating network exchange node and/or each end user termination featuring in at least one CDR an accumulator,
comparison means for determining for each CDR the presence of an accumulator established by a previous CDR including the same terminating network exchange node identity or network user termination identity and to increment the respective accumulator, each accumulator being periodically compared with a threshold to determine the presence of a potential fault at or between the terminating network exchange node and the network user termination.

10. A network management system as claimed in claim 9 in which an action file is created, the action file comprising a list of network exchange nodes and network user terminations in priority order in dependence upon the number of potential false answer events occurring within a pre-determined period.

11. A network management system as claimed in claim 9 in which the CDRs are generated by a method comprising:
detecting permanent or transient faults between or at a terminating network exchange node and a network user termination in which a network management system receives from a plurality of customer facing switches selected call detail records (CDR), each indicative of a potential false answer event (FAE), the CDRs being selected in respect of each call responding to a line signaling condition change with an apparent answer condition followed within a predetermined period of time by a call clear condition,
accumulating within the network management system a record of each called network exchange node and/or each network user termination a respective data log indicative of false answer events and
determining by thresholding against predetermined time and numeric criteria, identity of potentially faulty line conditions between or at particular network exchange nodes and network user terminations.

12. A network management system as claimed in claim 9 in which each of the plurality of telecommunications switches maintains a log of CDRs representing potential FAEs and the system periodically polls each associated switch for transfer of said rolling log for processing.

13. A network management system as claimed in claim 12 in which control means analyses each CDR in each said log to determine whether the CDR has been processed previously and deletes each previously processed CDR prior to incrementing accumulators in respect of identified terminating network exchange nodes and/or network user terminations.

14. A network management system as claimed in claim 12 in which a plurality of switch managers are disposed between said network management system and the telecommunications switches, each switch manager periodically polling a respective plurality of switches for the respective logs, the network management system periodically polling the switch managers to effect transfer of the respective accumulated logs.

15. A telecommunications switch comprising:
means to determine for each terminating call thereon, return of an answer condition in response to an applied change of line signaling conditions,
means to determine a call holding period between the answer condition and a call clear condition,
means to create for each terminating call in which the call holding period is less than a pre-determined period a call detail record including at least the identity of the network user termination for transfer to a network management system.

16. A telecommunications switch as claimed in claim 15 in which the call detail record also includes the identity of the terminating network exchange node.

17. A telecommunications switch as claimed in claim 15 in which the predetermined period (T2) is adjustable by user intervention to a period of between zero (0) and two and one half (2.5) seconds.

18. A telecommunications switch as claimed in claim 15 in which the predetermined period between the apparent call answer condition and the call clear condition lies between zero (0) and five hundred (500) milliseconds.

19. A telecommunications switch as claimed in claim 15 in which monitoring of the call clear condition occurs only if the period between application of the line signaling condition change and the apparent call answering condition occurs within a predetermined period (Ti).

20. A telecommunications switch as claimed in claim 19 in which the predetermined period (T1) is user selectable between zero (0) and two and a half (1,000) milliseconds.

21. A telecommunications switch as claimed in claim 19 in which the predetermined period (T1) lies between zero (0) and one thousand (1,000) milliseconds.

22. A telecommunications network comprising:
a plurality of switch manager systems each polling a respective plurality of digital local exchanges (DLE) to receive call detail records relating to calls terminating at network user terminations and which have been determined within the respective DLE which serves said termination to have had a call clear condition occurring within a predetermined short period after a call answer condition which in itself occurred after application of a change in line signaling conditions applied at the network exchange node serving said termination;
a network management system arranged periodically to poll each of the switch manager systems and to receive the (CDRs) for all of the DLE's, the network management system determining from the received call detail records the identity of each network user termination featuring in at least one CDR and thereby identifying network user terminations which are potentially faulty,
the network management system further providing prioritization of network user terminations in dependence upon the number of items the termination features in CDR's within a pre-specified period of time.

23. A telecommunications network as claimed in claim 22 in which, the CDR's created by the DLE's include information identifying the network exchange terminating node as well as the network user termination.

24. A telecommunications network as claimed in claim 22 in which CDR's determined as identifying short duration calls to faulty network terminations are transferred to a network billing and charging system to permit cancellation or inhibition of call charges arising from such calls.

25. A telecommunications network as claimed in claim 22 in which the network management system deletes CDR's from network billing systems where such CDRs relate to ineffective calls to a faulty network termination.

26. A method of detecting permanent or transient network faults in which a call billing system transfers billing CDRs to a network management system, the method comprising:
   comparing CDRs with each other to determine the occurrence of a multiplicity of short duration calls to a particular network user termination within a pre-determined period, and
   creating an action list in respect of each potentially faulty network user termination for transfer to a line testing system.

27. A method of detecting permanent or transient network faults as claimed in claim 26 in which the threshold for number of short duration calls is user selectable.

28. A method of detecting permanent or transient network faults as claimed in claim 26 in which the pre-determined period is user selectable.

29. A method of detecting permanent or transient network faults as claimed in claim 26 in which only multiple calls to a particular network user termination which originate from the same network user.

30. A method of detecting permanent or transient network faults as claimed in claim 29 in which the occurrence of four or more short duration calls within a period of five minutes each call being less than fifteen seconds in duration is used to determine a potentially faulty network user termination.

31. A method of inhibiting call charging including detecting a permanent or transient fault using the method of claim 26 and, if subsequent testing determines that a call is probably ineffective, inhibiting call charging in respect of a corresponding billing CDR.

32. A method of inhibiting call charging according to claim 31 in which billing CDR's in respect of ineffective calls are deleted from a centralized billing system.

33. A method of inhibiting call charging including detecting a permanent or transient fault using the method of claim 1 and, if subsequent testing determines that a call is probably ineffective and the call origination is not within the same billing environment, notifying the administration serving the call originating user termination of the identity of the ineffective call.

34. A method of detecting a potentially faulty network user termination point in a network other than the originating network using the method of claim 26.

35. A method of identifying a potentially faulty network termination point as claimed in claim 34 including notifying the administration serving the faulty network termination point.

36. A method of detecting permanent or transient network faults as claimed in claim 1 further comprising storing records of each potentially faulty network user termination and/or each potentially fault network exchange termination node and periodically analysing the stored records to determine whether recurrent patterns of faults occur to permit identification of intermittently faulty nodes or terminations.

* * * * *